Dec. 9, 1930.   J. V. PUGH ET AL   1,784,708
ROTATIONAL DRIVING CONNECTION
Filed Nov. 14, 1928    2 Sheets-Sheet 2
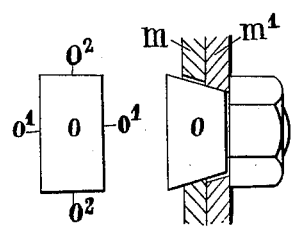
Fig.14.
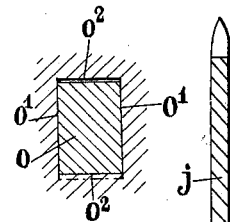
Fig.12.
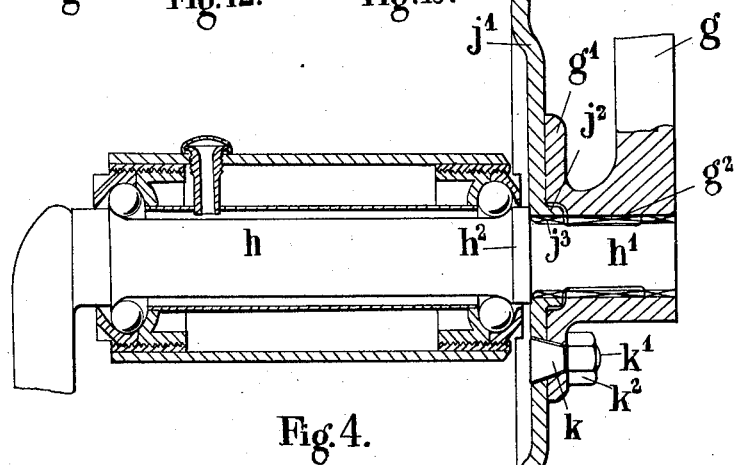
Fig.13.
Fig.4.
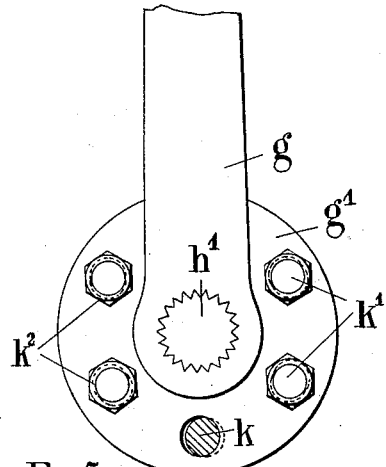
Fig.5.
J. V. Pugh & G. J. Bayliss
INVENTORS Patented Dec. 9, 1930

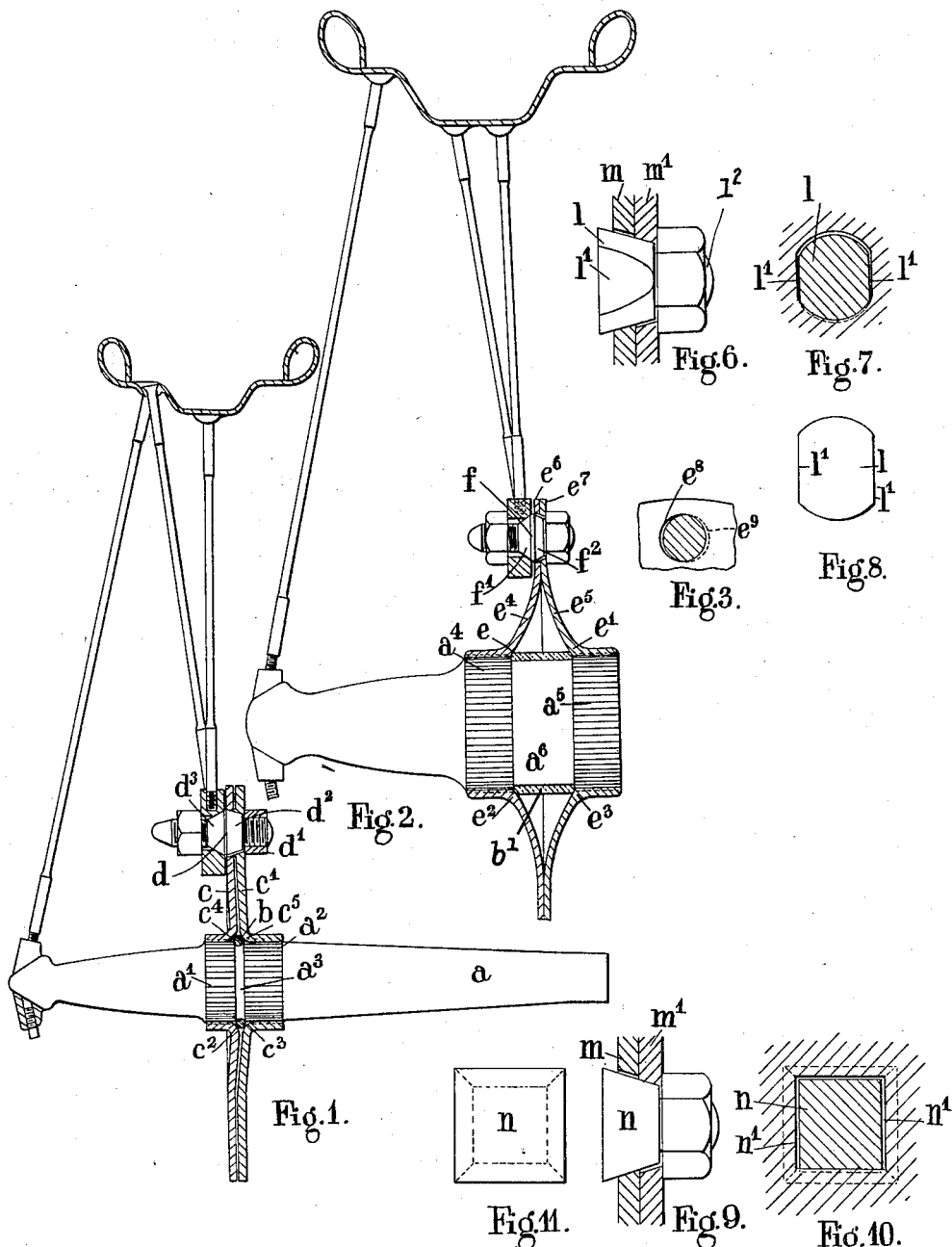

1,784,708

UNITED STATES PATENT OFFICE

JOHN VERNON PUGH AND GILBERT THOMAS BAYLISS, OF COVENTRY, ENGLAND; SAID BAYLISS ASSIGNOR TO SAID PUGH

ROTATIONAL-DRIVING CONNECTION

Application filed November 14, 1928, Serial No. 319,436, and in Great Britain November 21, 1927.

This invention relates to the mounting of one or more members upon a shaft or the like for rotation in common therewith or the transmission of torque.

In such connections the pressure upon the force-transmitting surfaces is often considerable and very variable particularly when the radial distance from the axis of rotation is not great and the inclination of said surfaces to the circumferential driving force is small or the area limited. In joints which are frequently dismantled it is difficult to avoid sliding or other clearance and this must generally cause looseness or "slack" in the connection which once present rapidly gets worse owing to a kinetic effect being added to the static pressure and this is particularly the case when the direction of the driving forces is frequently reversed.

The object of the present invention is to provide a both way torque-transmission coupling in which readily separable contact faces subjected to the circumferential forces due to torsion in either direction are pressed tightly together by the forcible insertion more or less at right angles to said forces of tapering elements in apertures in one or more of said members.

The invention consists in improvements in or relating to rotational driving connections as hereinafter described and pointed out in the claims.

Referring now to the accompanying drawings which show by way of example some ways of carrying the invention into effect:—

Figure 1 is a vehicle wheel structure connected to an axle flange formed in accordance with the invention;

Figure 2 shows a modified form of the invention applied to the connection of a vehicle wheel structure;

Figure 3 is a front view of the apertures in the discs shown at Figure 2;

Figures 4 and 5 show the invention applied to the connection of a pedal crank and chain wheel to the crank axle of a bicycle or the like;

Figures 6, 7 and 8 show a modified form of connecting bolt;

Figures 9, 10 and 11 show another form of bolt of square section, and

Figures 12, 13 and 14 show a rectangular section bolt.

In carrying the invention into effect in one simple form, a central shaft or like element is provided with a cylindrical region of somewhat increased diameter upon which is formed a series of serrations and ridges of cross-sectional profile resembling the shape employed in an ordinary Whitworth V screw thread. A pair of outer members in the form of flat circular discs (which may represent the central region of any wheel or other member to be attached to the shaft) are provided with central apertures complimentary to the cross section of the serrated region of the shaft so that they will slide in an axial direction easily thereon.

At similar radial distances upon opposite sides of the centres the discs are provided with apertures adapted to receive tapered pins or pegs passing through the two discs but the apertures of the one disc are each circumferentially displaced in the same direction a small amount in relation to the apertures of the other disc.

The displacement may amount to some 2° in angular measurement but in any case it must be sufficient to cause angular movement of one disc relative to the other when two discs are drawn tightly together in an axial direction by tapering bolts adapted to fit the holes and having nuts coacting with washers contacting with an outer surface of one of the discs.

The relative angular movement results in one of the discs being pressed tightly against one side of the ridges of the serrated portion and the other disc being tightly pressed against the opposite sides of the said ridges so that rotational slackness is entirely eliminated in the joint which is adapted to form a rotational driving connection either in a clockwise or anti-clockwise direction without any possibility of shake or play which would result in wear of the serrated portion and the cooperating apertures of the discs.

Where the axial position of two or more members or discs upon a central serrated part is of importance the two members or discs may be located by means of a split multi-part or other expanding and contracting ring which is preferably of circular cross section.

A groove is formed at the correct location in the serrated part of the central member and to avoid weakening the same the groove may be only as deep as the bottoms of the serrations. A split ring may be sprung into the groove or a series of parts of a ring or other expandable device placed therein and these may be held down by contact with the adjacent edges of the two apertures in the two members, the apertures for this purpose being provided with bevelled, rounded or like flaring edges so that the drawing of the members together over the ring or the like holds it firmly in the groove and definitely locates all the parts in an axial direction.

In carrying the invention into effect in the form illustrated in Figure 1 a short axle end $a$ which is to be supported in a roller or like outer bearing member by means of which the steering is effected is provided with a serrated or like band or region $a'$, $a^2$ in the centre of which there is formed a groove $a^3$ of semi-circular cross section.

A split ring or series of parts of a ring $b$ of circular section material is fitted in the groove $a^3$ so that half lies below the points of the projections between the serrations and the other half projects as a semicircular collar above the tops of said serrations.

The split ring $b$ forms a positioning means for two discs or like flange members $c$, $c'$ which are preferably formed from stamped material of uniform thickness and each provided with a central boss $c^2$ and $c^3$ the interiors of which are made complementary to the cross section and length of the serrated band divisions $a'$, $a^2$.

The two discs are provided at $c^4$, $c^5$ upon their adjacent faces with bevelled or rounded edges surrounding the central apertures which fit upon the serrated band and the rounded surfaces are adapted to contact upon each side with the split ring $b$ positioned in the groove $a^3$ so that when the two discs are drawn together by bolts or studs $d$ the ring is held tightly in the groove and forms an efficient positioning means for the discs.

The apertures in the discs for the bolts $d$ by which they are connected together are formed tapering and as hereinafter more fully described slightly displaced from one another in a circumferential direction so that by forcing the two discs together by tightening the nuts $d'$ for complementary serrated portions of the bosses and the shaft are caused to press tightly upon opposite sides against one another and form a rigid connection for driving in either direction without rotational slackness.

The bolts $d$ which hold the discs together are in Figure 1 shown double ended with a central barrel portion tapering from a maximum diameter at the middle of the barrel to a smaller diameter adjacent to the threaded regions at each end of the bolts or studs. One of these tapering regions $d^2$ co-operates with the slightly displaced holes in the discs $c$, $c'$ as already described and the other tapering region $d^3$ projects together with its adjacent threaded portion from the outer face of the outer disc $c$ and forms in the construction illustrated the connecting means for a vehicle wheel structure.

Three or more of the before-mentioned connecting bolts $d$ may be fitted at equal distances around the circumference of the two discs $c$, $c'$ which when bolted together function as a solid flange upon the shaft and the already referred to projecting parts of these bolts as shown constitute the attachment means for a vehicle wheel structure of the kind described in British application No. 27960/27 or the discs may be employed in any other way.

In Figure 2 the serrated portions $a^4$, $a^5$ are separated by a wide groove $a^6$ in which is positioned a flat ring $b'$ which may be split or formed in two or more segments.

The discs $e$, $e'$ are in this case dished or recessed in order to give lateral rigidity and the material from which the discs are formed is tapered in thickness.

The full thickness material is employed for the bosses $e^2$, $e^3$ the interiors of which are formed complementary to the serrated regions $a^4$, $a^5$ as described in connection with Figure 1.

From the bosses $e^2$, $e^3$ the material of the discs is tapered away through the recessed regions $e^4$, $e^5$ until it reaches a minimum thickness in the flat abutting portions $e^6$, $e^7$ of the flanges.

In this construction double-ended bolts or studs $f$ which are generally similar to the studs $d$ of Figure 1 are employed, the tapered region $f^2$ fitting in the displaced apertures $e^8$, $e^9$ of the discs as shown more clearly in Figure 3, the dimensions of the holes and tapered region of the bolt together with the amount of displacement of the holes in the two discs being such that clearance is provided in both discs in a radial direction while in the circumferential direction the clearance is on one side in one disc and on the other side in the other disc.

Figures 4 and 5 show a bicycle pedal crank $g$ provided with a flange $g'$ constituting one of the two discs and having a serrated aperture $g^2$ complementary to a serrated cylindrical projecting end $h'$ of a bicycle crank axle $h$.

The axle $h$ is provided with a collar $h^2$ between the ball race and the serrated region and against this collar fits the chain wheel $j$ the central portion $j'$ of which constitutes the other disc of the coupling and is provided with a boss $j^2$ having a serrated aperture $j^3$ also complementary to the serrated projection $h'$ of the crank axle.

Circumferentially displaced tapering holes as already described are formed in the parts $j'$ and $g'$ and in these are inserted conical or tapering cotter-like members $k$ provided with threaded ends $k'$ and nuts $k^2$ by which they are drawn tightly into the circumferentially displaced holes and result in the chain wheel and crank being firmly pressed against opposite sides of the serrations on the part $h'$ and constituting a driving connection which is free of any rotational slackness.

The taper pins or bolts may be of truly conical configuration and when of such form they are easy to construct and the apertures for them are easily formed. Such configuration, however, gives a slightly restricted contact area and in some instances it may be desirable to employ flat-sided taper pins which would give a greater contact surface for a given size of pin.

The holding-together bolts may pass through elongated holes in the discs or circular holes of large enough diameter to allow of the desired rotational adjustment when the tapering elements are tightened and the discs or like members brought in close contact with the sides of the serrations of the central member to effect driving in either direction without slackness.

Some alternative forms of holding-together bolts or cotters are shown in Figures 6 to 14, Figures 6, 7 and 8 showing a conical cotter $l$ having flattened parallel sides $l'$. Figure 6 is a sectional view on a plane tangent to the bolt circle and in this the discs $m$, $m'$ are shown with clearance on one side in the one disc and clearance upon the other side in the other disc. Figure 8 shows the end of the cotter opposite to the screw-threaded portion $l^2$ and Figure 7 is a section through the small end of the cotter showing that there is a substantial fit or very little clearance on the sides $l'$ with the corresponding necessary clearance on the opposite sides in the two discs.

Figures 9, 10 and 11 show a cotter $n$ of square section tapering in both directions. Full clearance is provided upon opposite sides in the two discs $m$, $m'$ whereas clearance of about half this amount is provided in the holes on the sides $n'$ of the cotter.

In Figures 12, 13 and 14 a rectangular cotter $o$ having two taper sides $o^2$ and two parallel sides $o'$ is provided with clearance on the sides $o^2$ on one side in the one disc $m$ and on the other side in the other disc $m'$ while on the sides $o'$ an easy sliding fit may be maintained.

It is to be understood that the constructions hereinbefore described are given by way of example only and that the invention may be employed in many different connections without in any way departing from the spirit thereof.

Having now described our invention, what we claim as new and desire to secure by Letters Patent is:—

1. A two way drive torque-transmission coupling comprising a rotatable element, having an engaging region of non-circular cross section, not less than two members with apertures complementary to said engaging region positioned thereon and having faces adjacent one another, radially corresponding but circumferentially slightly displaced apertures through said faces and wedging means in said displaced apertures to cause rigid gripping of the engaging region by said members.

2. A two way drive torque-transmission coupling comprising a rotatable element, having an engaging region of non-circular cross section and having a peripheral groove dividing said region, a ring sprung into said groove and projecting above the outermost portion of the engaging region, two members with apertures complementary to said engaging region positioned thereon and having faces adjacent one another on opposite sides of said ring, radially corresponding but circumferentially slightly displaced apertures through said faces and wedging means in said displaced apertures to cause rigid gripping of the engaging region and ring by said members.

3. A two way drive torque-transmission coupling comprising a rotatable element, having an engaging region of non-circular cross section whose outermost edges trace a surface of revolution, not less than two faced members with apertures complementary to said engaging region positioned adjacent one another on said engaging region, apertures through said faced members at corresponding radial distances but slightly displaced circumferentially from one another and tapering cotter means in said displaced apertures to cause relative rotary movement of said members and rigid gripping of the engaging region thereby.

4. A two way drive torque-transmission coupling comprising a rotatable element, having an engaging region of non-circular cross section whose edges trace a surface of revolution, a circumferential groove in said engaging region, a ring sprung into said groove and projecting above the outermost portions of said engaging region, two faced members with apertures complementary to said engaging region and positioned thereon adjacent one another and on opposite sides of said ring, apertures through said faced members at corresponding radial distances but slightly displaced circumferentially from one another and tapering cotter means in said displaced apertures to cause relative movement of said members and rigid gripping of the engaging region and ring thereby.

5. A two way drive torque-transmission coupling comprising a rotatable element, having a serrated engaging region, two members with apertures complementary to said engaging region positioned thereon and having faces adjacent one another, radially corresponding but circumferentially slightly displaced apertures through said faces and tapering cotter means in said displaced apertures to cause relative movement of said members and rigid gripping of the opposite sides of the serrations by the two members.

6. A two way drive torque-transmission coupling comprising a rotatable element, having a serrated engaging region divided by a circumferential groove, a ring sprung into said groove and projecting above the tops of the serrations, two members with apertures complementary to said engaging region and positioned thereon and having recesses for receiving said ring and having faces adjacent one another on opposite sides of said ring, apertures though said faced members at corresponding radial distances but slightly displaced circumferentially from one another, tapering cotter means in said displaced apertures and means for axially forcing in said cotter means to cause relative movement of said members and rigid gripping of the engaging region and ring thereby.

In testimony whereof we have signed our names to this specification.

JOHN VERNON PUGH.
GILBERT THOMAS BAYLISS.